United States Patent [19]

Källman

[11] Patent Number: 4,730,452

[45] Date of Patent: Mar. 15, 1988

[54] POWER PLANT WITH A COMBUSTION CHAMBER WITH COMBUSTION IN A FLUIDIZED BED

[75] Inventor: Bert Källman, Västerås, Sweden

[73] Assignee: ASEA Stal AB, Västerås, Sweden

[21] Appl. No.: 895,970

[22] Filed: Aug. 13, 1986

[30] Foreign Application Priority Data

Aug. 26, 1985 [SE] Sweden ........................ 8503959

[51] Int. Cl.[4] ........................ F02C 3/26; F02G 1/00

[52] U.S. Cl. ........................ 60/39.464; 122/4 D; 110/336

[58] Field of Search ........................ 60/39.464; 122/40; 110/245, 203, 336, 338, 339; 431/7, 170; 52/506, 509

[56] References Cited

U.S. PATENT DOCUMENTS

| | | | |
|---|---|---|---|
| 1,723,621 | 8/1929 | Jewell | 52/509 |
| 3,368,802 | 2/1968 | Morgan et al. | 110/336 |
| 3,742,670 | 7/1973 | Byrd, Jr. | 110/336 |
| 3,778,942 | 12/1973 | Bondi | 52/509 |
| 3,798,710 | 3/1974 | Tinnerman | 52/506 |
| 3,961,453 | 6/1976 | Couwenbergs | 52/509 |
| 4,074,492 | 2/1978 | Simpson et al. | 52/509 |
| 4,430,837 | 2/1984 | Kirschenbaum | 52/506 |
| 4,432,289 | 2/1984 | Norman et al. | 110/336 |
| 4,633,636 | 1/1987 | Alexander | 52/506 |
| 4,638,618 | 1/1987 | Iesaka et al. | 52/509 |

FOREIGN PATENT DOCUMENTS

| | | |
|---|---|---|
| 315991 | 10/1973 | Austria . |
| 488990 | 1/1930 | Fed. Rep. of Germany . |
| 2055803 | 3/1972 | Fed. Rep. of Germany . |
| 2317064 | 6/1974 | Fed. Rep. of Germany . |
| 2451448 | 5/1975 | Fed. Rep. of Germany . |
| 2458986 | 6/1976 | Fed. Rep. of Germany . |
| 704271 | 2/1954 | United Kingdom . |

*Primary Examiner*—Carlton R. Croyle
*Assistant Examiner*—Timothy S. Thorpe
*Attorney, Agent, or Firm*—Pollock, Vande Sande & Priddy

[57] ABSTRACT

A power plant with a combustion chamber, in which fuel is burnt in a fluidized bed of a particulate material. The walls of the combustion chamber are provided on their inner side with a layer of a heat insulating material. Channel-section members are arranged between fixing means with the flanges of the channel-section members directed inwards towards the combustion chamber space. Plates cover openings which are formed between the channel-section members. These cover plates are provided with flanges passing in between the flanges of the channel-section members. The cover plates are held in position by fixing members and elements which connect the fixing members to the combustion chamber wall.

8 Claims, 7 Drawing Figures

POWER PLANT WITH A COMBUSTION CHAMBER WITH COMBUSTION IN A FLUIDIZED BED

TECHNICAL FIELD

The invention relates to a power plant with a combustion chamber, in which fuel is burnt in a fluidized bed of particulate material, the bed material usually at the same time being a sulfur absorbent. The combustion can take place at a pressure close to atmospheric pressure, or at a considerably elevated pressure. In the latter case, the pressure may amount to 2 MPa or more. Combustion gases created in the combustion chamber are utilized in one or more turbines for driving a compressor to supply the combustion chamber with combustion air and for driving a generator delivering current to an electric network. A power plant with combustion at elevated pressure is usually given the international designation "PFBC plant", the letters "PFBC" being an abbreviation of "Pressurized Fluidized Bed Combustion". In such a plant the combustion chamber, and usually also a cleaning plant for the combustion gases, are contained within a pressure vessel.

BACKGROUND ART AND TECHNICAL PROBLEM

In power plants of the above-mentioned kind, the wall of the combustion chamber is subjected to large forces. Between the space in the pressure vessel around the combustion chamber and the space inside the combustion chamber, a pressure difference arises in operation, which is due—on the one hand—to the resistance in the nozzles for the supply of air for fluidization of a bed material in the bottom part of the combustion chamber, and—on the other hand—to the resistance within the fluidized bed. This pressure difference may amount to the order of magnitude of 0.1 MPa (1.0 bar). The combustion chamber wall(s) may have an area of $10\times20$ m, so the forces which act on the wall(s) of the combustion chamber are very large, and pose constructional problems which are difficult to solve. In addition, the bed is very heavy and its operating temperature is high, (750°-950° C.). The forces arising because of the pressure difference between the inner and outer sides of the combustion chamber can be taken up by a framework. By thermally insuling of the combustion chamber and cooling the framework with combustion air the temperature of the framework is allowed to be kept low enough—below about 300° C. that its strength is not impaired.

SUMMARY OF THE INVENTION

According to the present invention, the combustion chamber is provided with internal thermal insulation. In this way, and optionally also by cooling the combustion chamber wall with air and/or water, the temperature of the wall may be kept low enough that a simple construction material of small thickness can be used in spite of the fact that the wall is subjected to considerable forces because of the pressure difference existing between the inner and outer sides of the wall. The fluidized bed material is prevented from coming into direct contact with the gas-tight wall of the combustion chamber, thus eliminating the risk of erosion. The lift of the difficulty-replaceable combustion chamber is in these ways increased. To prevent bed material from eroding away insulating material, the internal thermal insulation is covered with easily replaceable sheet elements which are arranged such that thermal movements can be absorbed at the joints between adjacent sheets. Because the thermal insulation is protected, inorganic fiber material having good heat insulating properties can be used. Between fixing members passing through the insulating layers there are applied channel-section members with their flanges directed towards the interior of the combustion chamber space. These channel-section members define a grid having triangular, square, rectangular or hexagonal grid spaces. Flanged cover plates are applied over these grid spaces, the flanges of the plates being located between the flanges of the channel-section members.

The cover plates can be retained by fixing elements formed as plates overlapping the corners of the cover plates and being joined to the outer side of the wall of the combustion chamber. At each fixing point the wall may be provided with a rod or sleeve passing through the insulating layer. The fixing elements may be connected to the rods by means of a wedge. Alternatively, a rod connected to the fixing element may extend through a sleeve and be locked in position by a nut or wedge. A resilient element may be applied between the nut or wedge and the outer side of the combustion chamber wall. The invention enables movements between cover plates and channel-section members upon temperature changes. Further, it enables simple and rapid replacement of worn cover plates and channel-section members as well as of damaged insulation during inspection periods.

BRIEF DESCRIPTION OF THE DRAWINGS

The invention will be described in greater detail, by way of example, with reference to the accompanying drawings, wherein.

DESCRIPTION OF THE PREFERRED EMBODIMENT

Figure 1:
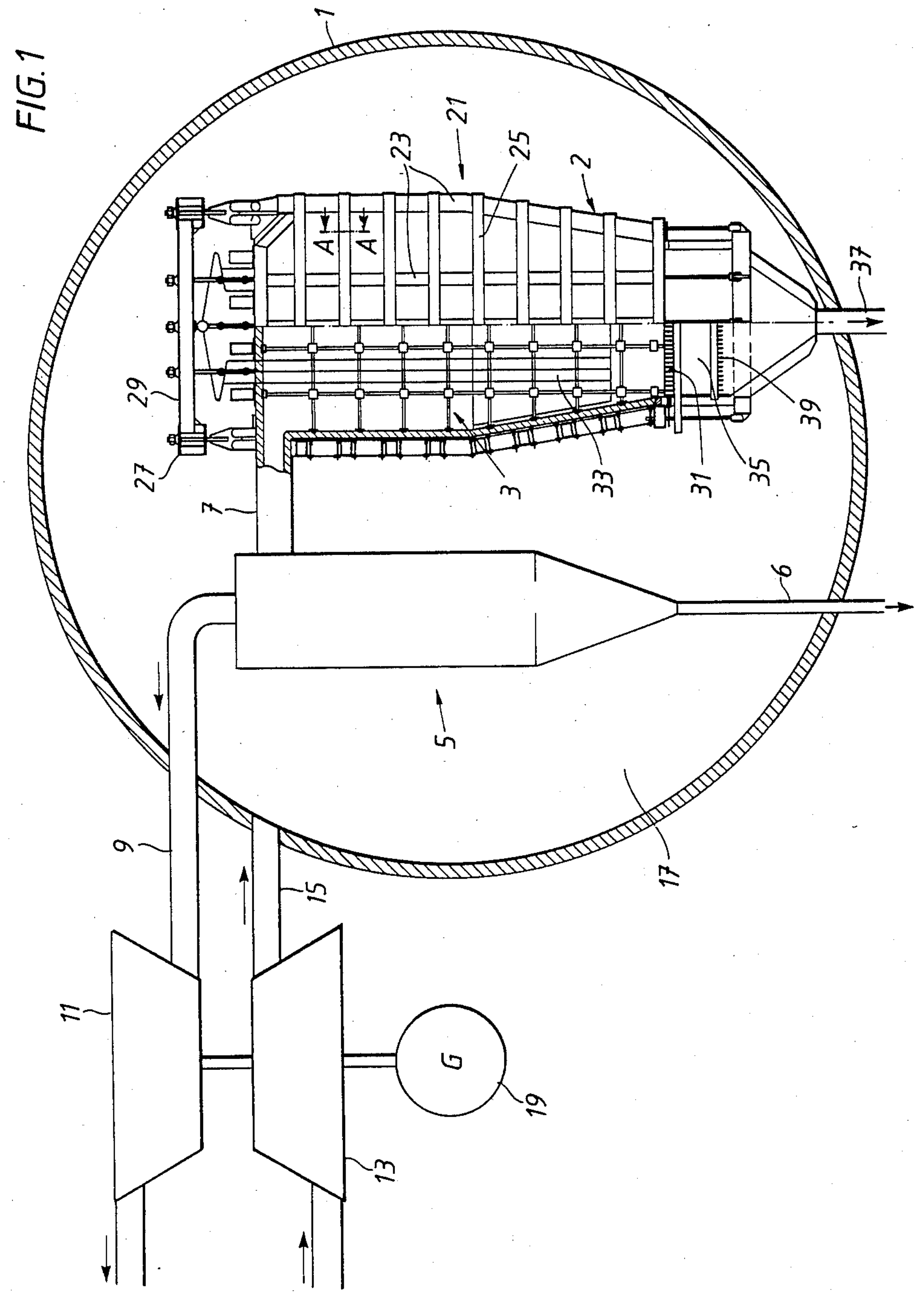
FIG. 1 shows a schematic view of a PFBC power plant according to the present invention.

In the Figures, 1 designates a pressure vessel, 3 a combustion chamber and 5 a gas-cleaning plant of cyclone type located inside the pressure vessel 1. Only one cyclone is shown, but in reality the gas-cleaning plant 5 includes a plurality of parallel groups of series-connected cyclones. Combustion gases created in the combustion chamber 3 are passed through a conduit 7 to the gas-cleaning plant 5 and from there through a conduit 9 to a turbine 11. The turbine 11 drives a compressor 13 which through a conduit 15, supplies the space 17 in the pressure vessel 1 with compressed combustion air at a pressure which may amount to 2 MPa or more. The turbine 11 also drives a generator 19, which feeds out energy to an electricity supply network (not shown). The generator 19 can also be utilized as a starter motor. The turbine-compressor pair 11, 13 may be designed in many different ways in accordance with known techniques. The plant comprises a fuel feeding system schematically represented by the arrow 2 and an ash discharge system connected to outlet pipe 6 of the plant 5. The ash discharge system may be for example of the types disclosed in the specification of a U.S. patent application filed on May 9, 1986 in the name of R. Brönnström (assigned to ASEA-STAL AB) and in the specification of U.S. CIP application Ser. No. 563,427 filed on the Dec. 20, 1983 now U.S. Pat. No. 4,699,210 in the name of R. Brönnström and also assigned to ASEA-STAL AB, as well as other conventional auxiliary equipment.

The combustion chamber 3 is surrounded by a framework 21 of vertical and horizontal beams 23 and 25, respectively. The combustion chamber 3 and the framework 21 are both suspended from a beam system including longitudinal and transverse beams 27 and 29. The beams 27 are attached to the wall of the pressure vessel 1 or supported by columns (not shown). The framework 21 and the combustion chamber 3 are suspended from the beams 27 and 29 by means of separate pendulum supports, enabling movement between them. The combustion chamber 3 includes a bottom 31 provided with air nozzles. Through these nozzles the space 33 within the combustion chamber 3 is supplied with air for fluidization of a particulate bed material and for combustion of the fuel supplied through 2 to the bed. The bottom 31 is so sparce as to allow consumed bed material to fall down into a space 35 and be withdrawn through a discharge conduit 37. The space 35 includes a tubular coil 39 with openings through which cooling air is supplied to the space 35 in order to cool bed material to be withdrawn.

Figure 2:
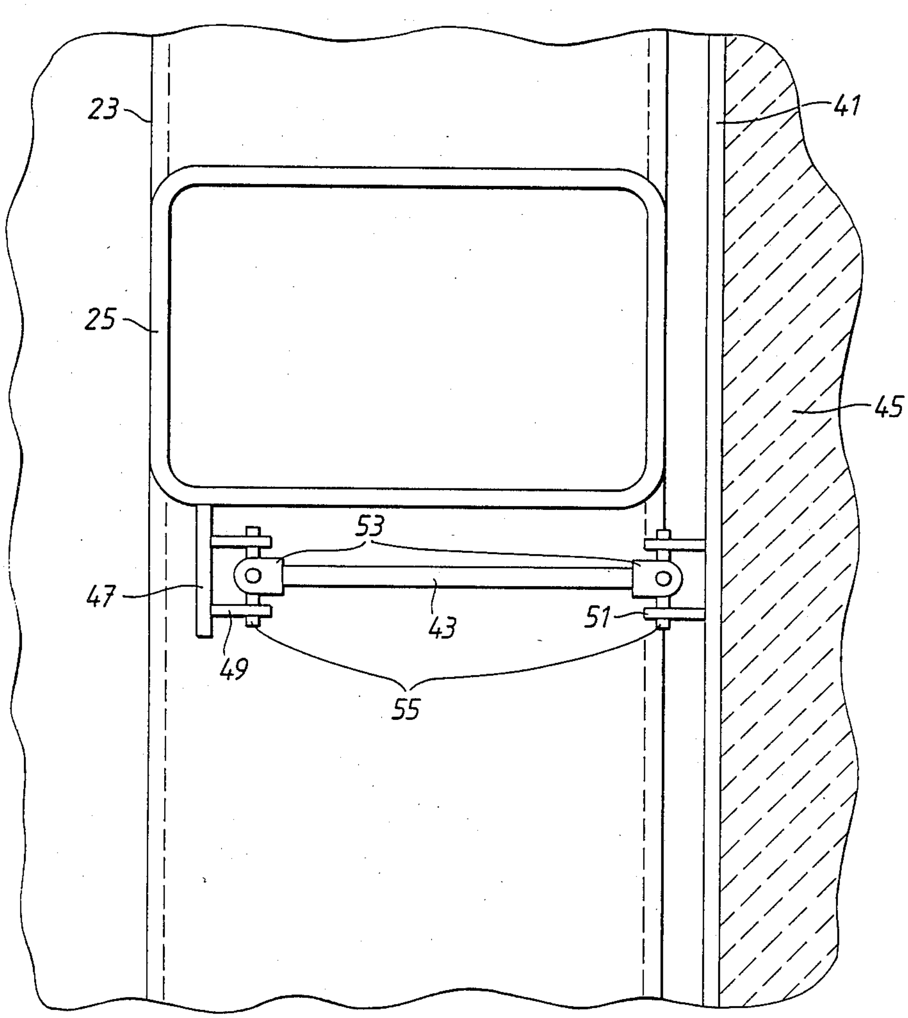
FIG. 2 shows an enlarged sectional view on the line A—A in FIG. 1 through the outer part of the combustion chamber wall and the surrounding supporting framework.
Figure 3:
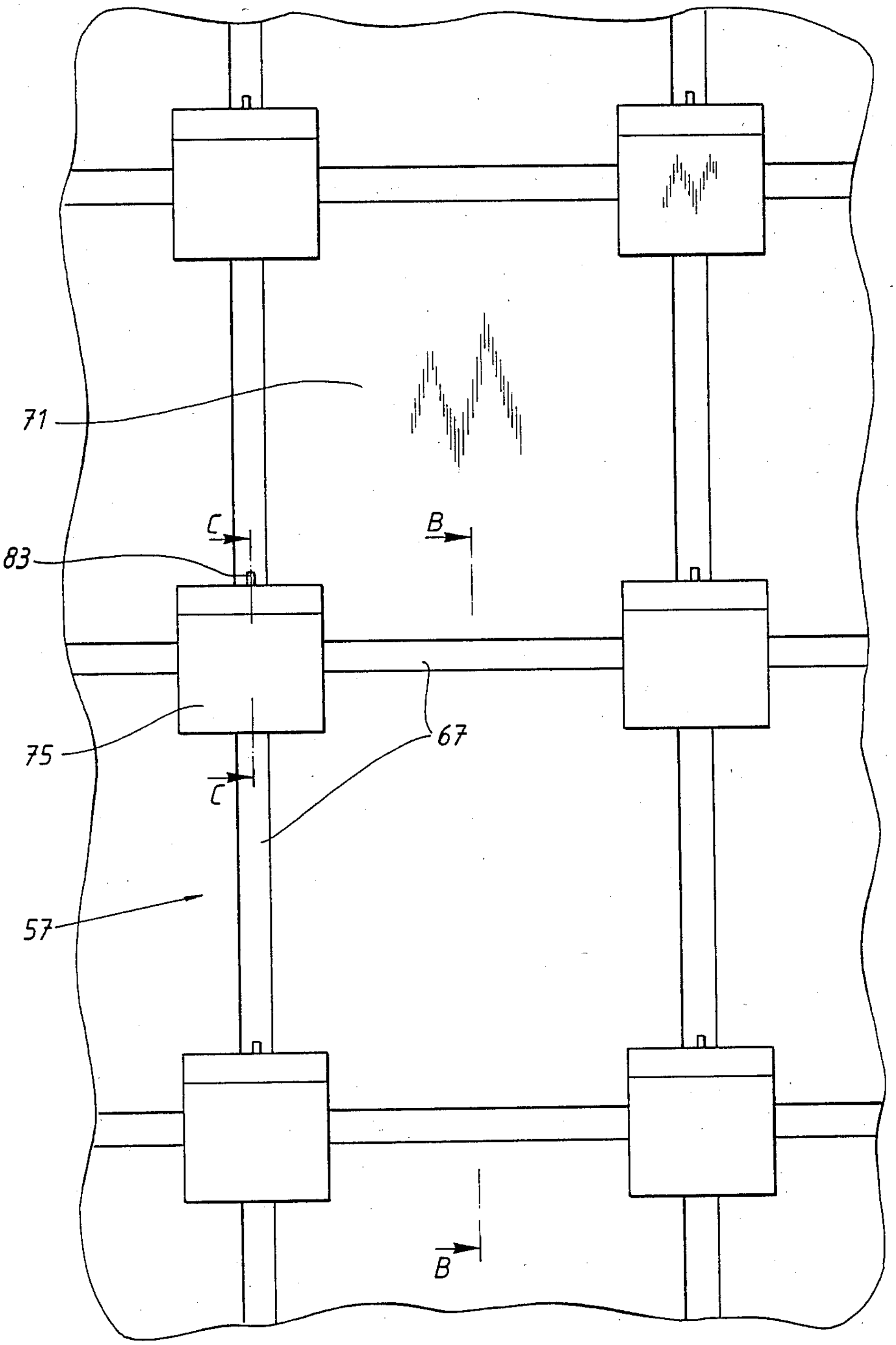
FIG. 3 shows a view of the combustion chamber wall of the plant of FIG. 1 seen from inside the combustion chamber.
Figure 5:
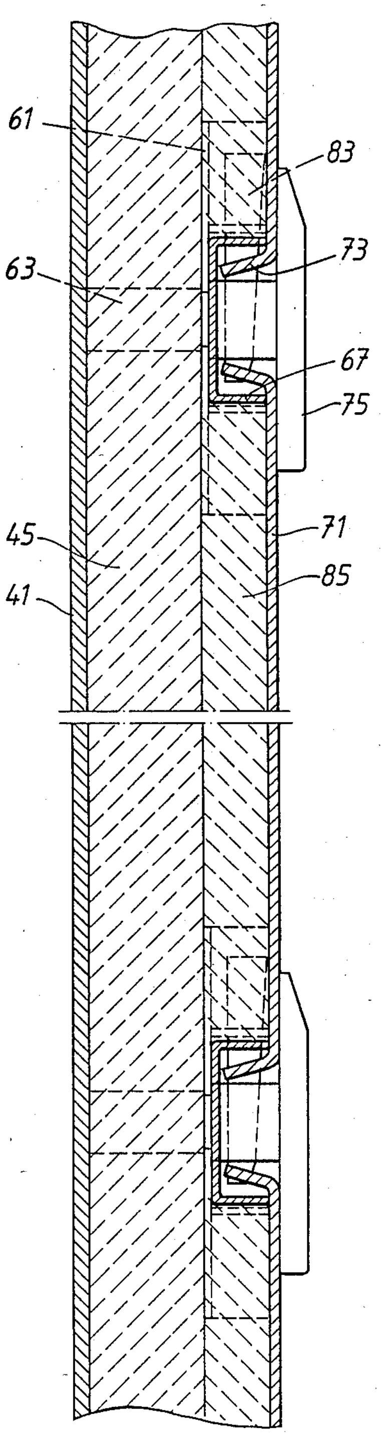
FIG. 5 shows an enlarged sectional view through the combustion chamber wall on the line B—B in FIG. 3, and FIGS. 6 and 7 show further enlarged sectional views through the combustion chamber wall on the line C—C in FIG. 3 of two alternative embodiments.
Figure 6:
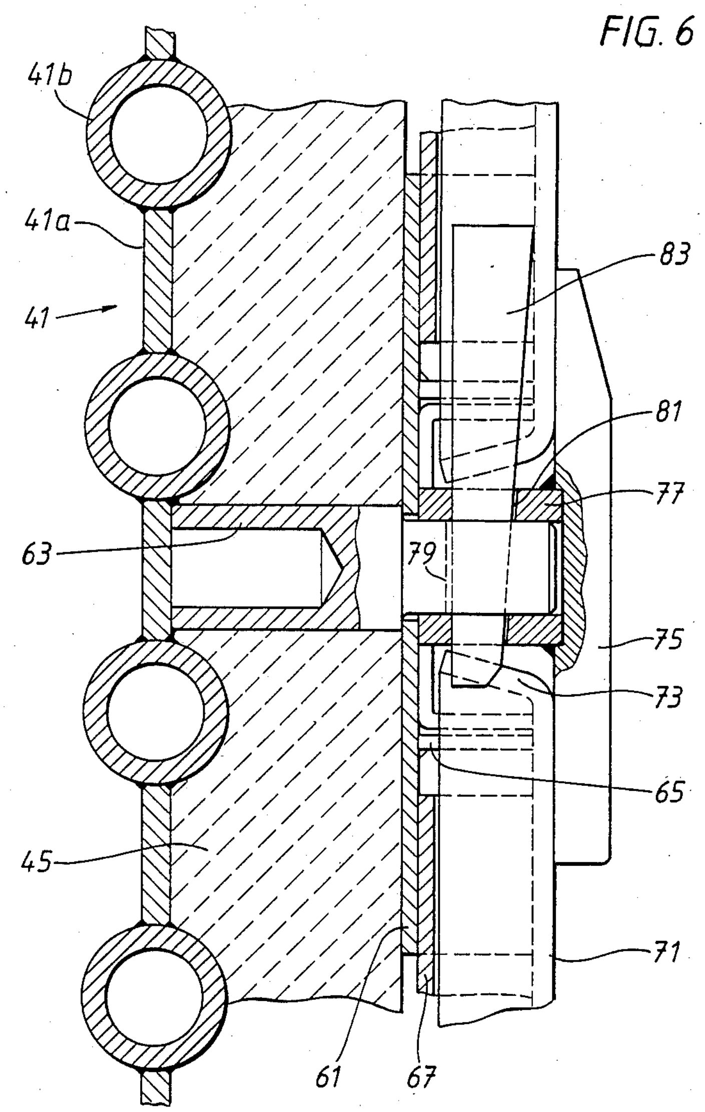

The combustion chamber 3 comprises a gas-tight wall 41, as will be clear from FIGS. 2, 5 and 6. Because of flow resistance in the nozzles of the bottom 31 and in the fluidized bed, a pressure difference arises between the space 17 around the combustion chamber 3 and the combustion chamber space 33. The pressure difference may amount to 0.1 MPa. The combustion chamber wall 41, which may have a length of 10 m and a height of 10 m or more, will be subjected to a very large force. For taking up this force, according to the present invention, the combustion chamber 3 is surrounded by a framework 21, separate from the combustion chamber. The framework 21 and the combustion chamber 3 are united by means of a number of force-absorbing rods 43, which transfer the force caused by the pressure difference on the wall 41 of the combustion chamber 3 to the framework 21. In spite of the fact that the combustion chamber wall 41 is cooled by the surrounding combustion air and is provided on its inner side with a thermally insulating layer 45, it will be heated to a considerably higher degree than the framework 21 and will expand more than the framework 21. To enable movement between the combustion chamber 3 and the framework 21 to be accommodated in both the vertical and lateral directions, each rod 43 is articulately attached to the framework 21 and to the wall 41 at each end, thus enabling angular movements in all directions. In the embodiment shown in FIG. 2, the framework beam 25 is provided with a bracket 47 with lugs 49, the wall 41 is provided with lugs 51 and the rods 43 are provided with bifurcated end pieces 53. The end pieces 53 and the lugs 49 and 51, respectively, are interconnected by means of a spider 55, thus obtaining cardan joints permitting angular movements in all directions. Many other types of articulated connections are feasible, for example ball joints.

Figure 4:
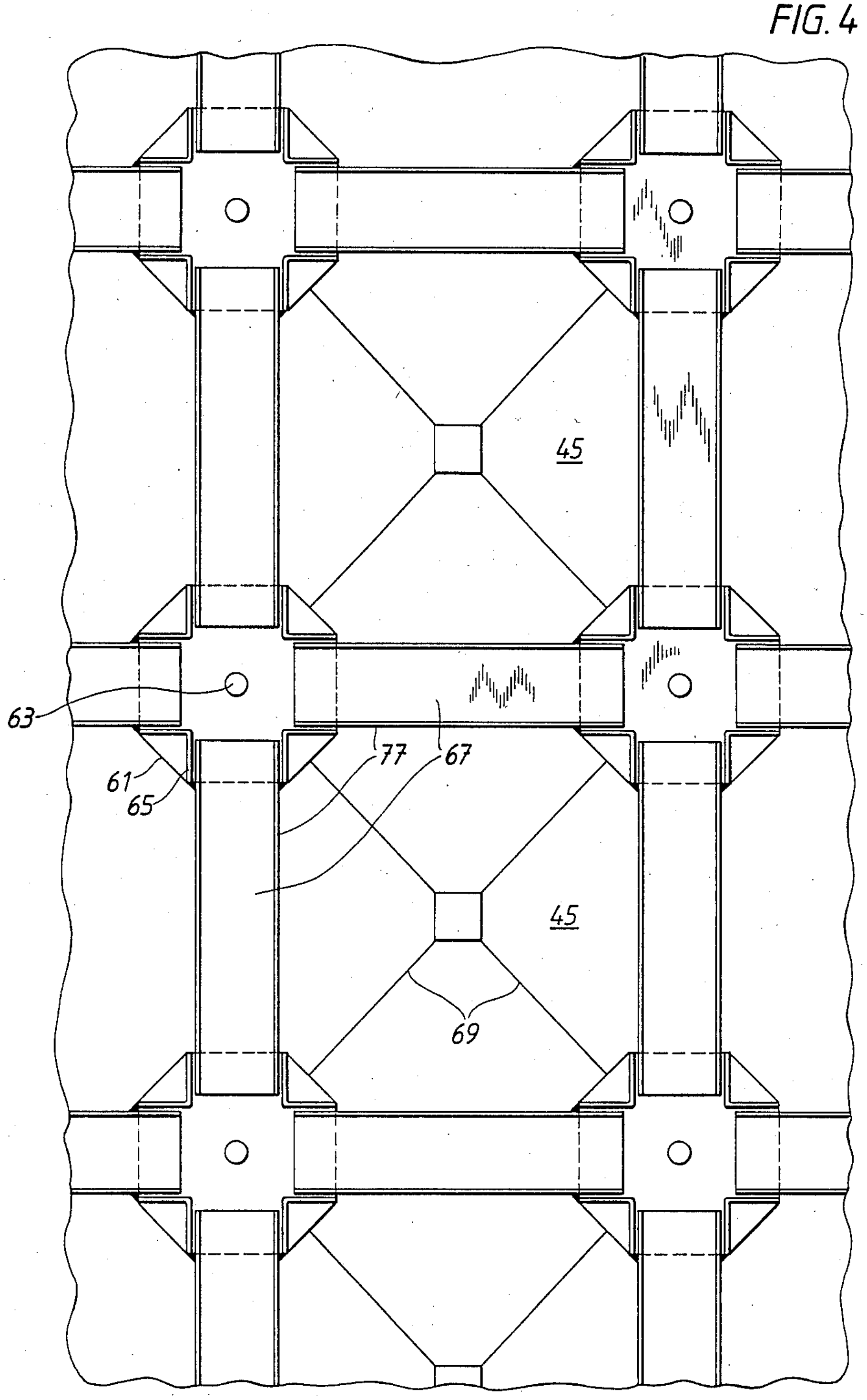
FIG. 4 shows a corresponding view, in which the cover plates of the walls are not in place.
Figure 7:
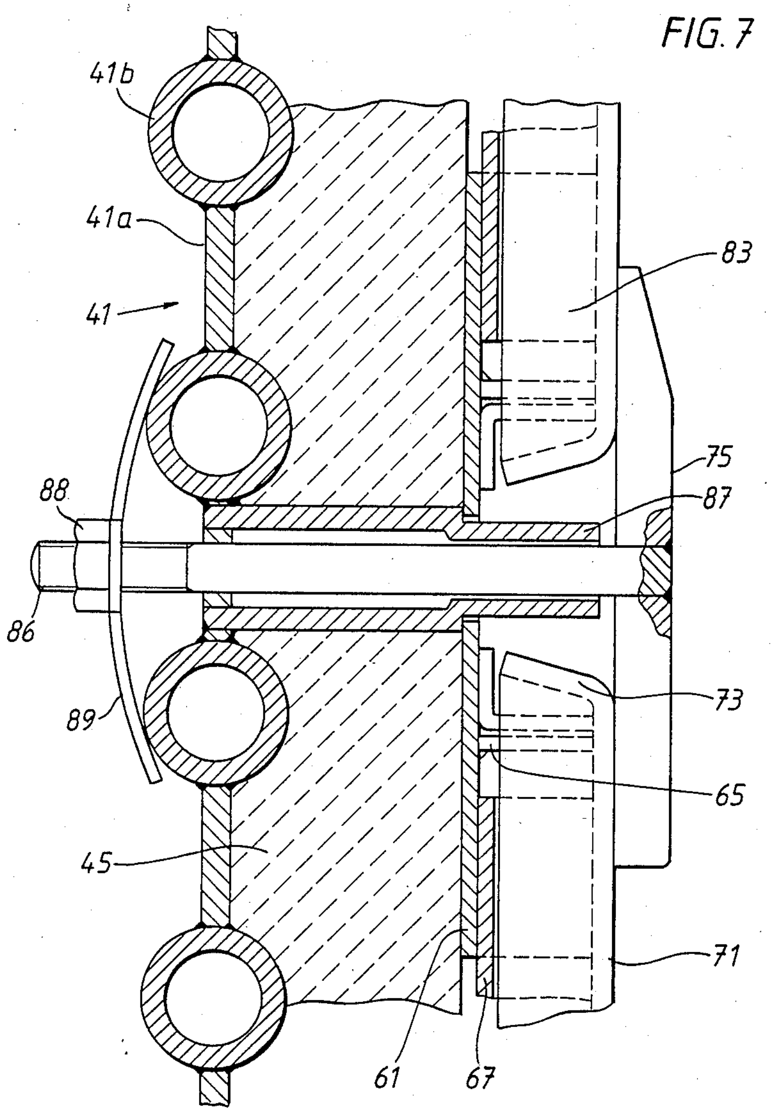

On its inner side, the combustion chamber wall 41 is faced with a sheet metal surface 57 protecting the insulating layer 45, which may then consist of an inorganic fiber material. The metal surface 57 may be constructed from a number of sheet segments which are movable in relation to each other, thus permitting thermal expansion/contraction without buckling and without the appearance of any significant stresses in the sheet segments. As will be clear from the Figures, the sheet metal surface 57 may be constructed of a number of plates 61 which are fixedly joined to the combustion chamber wall 41 by means of rods 63. The plates 61 are suitably located in a rectangular or square grid pattern. The plates 61 are provided with welded-on angle irons 65 which form four U-shaped guides for channel-shaped sections 67 (see FIG. 4) which interconnect two adjacently positioned plates 61. The flanges of the sections 67 are directed inwardly towards the combustion chamber space 33. At one end, each section 67 is welded to a respective plate 61 but its other end is axially freely movable in the U-shaped guide of an adjacent plate between the angle irons 65, so that each section 67 can extend freely. Between the plates 61 there may be positioned a cruciform holder 69 which serves to hold the insulating layer 45 in position. Square (rectangular) cover plates 71 with flanges 73 are located over the grid openings between the sections 67 and are arranged with the flanges 73 lying in the grooves provided by the sections 67, so that the entire inner surface of combustion chamber wall is faced with metal. In the embodiment shown in FIG. 6, the cover plates 71 are retained in place by fixing plates 75. Each fixing plate 75 has a sleeve 77 projecting from one side, the sleeve 77 sliding over the rod 63. The rod 63 and the sleeve 77 contain slots 79 and 81, respectively, to receive a locking wedge 83. As shown in FIG. 6, the outer wall 41 may be constructed as a cooled panel wall consisting of welded-together plates 41*a* and cooling tubes 41*b*. Alternatively, as shown in FIG. 7, the rod 63 may be replaced by a tube 87 and the fixing plate 75 be joined to the outer wall 41 by a bolt 86 passing through the tube 87 and the outer wall and be fixed there by means of a nut 88. Between the nut 88 and the outer wall 41 there may be a spring, for example a leaf spring 89 or a number of cup springs, which provide a resilient attachment of the cover plates 71. As shown in FIG. 5, the cover plates 71 may contain a layer of thermally insulating material 85 between the flanges 73.

What is claimed:

1. A power plant with a combustion chamber having a wall having an outer and inner side, said wall defining a combustion chamber space in which fuel is burnt in a fluidized bed of particulate material said wall comprising:

a layer of thermally insulating material provided on the inner side of the wall and including;

a plurality of flanged channel-section members, having flanges directed inwardly toward the combustion chamber and a plurality of U-shaped guiding members;

said channel-section members and said guiding members defining a grid, said grid including a plurality of grid units, each unit including at least two channel-section members and guiding members constituting corners of said unit, each guiding member receiving ends of said channel section members, at least one end of each channel-section member being movably disposed in said guiding member;

a plurality of cover plates having edge elements, each cover plate covering a respective unit of said grid, said edge elements extending between said flanges of said channel-section members forming said grid unit;

a plurality of fixing members overlapping corners of said cover plates; and, means for securing said fixing means to the outer side of the wall and retaining said cover plates in place in said grid unit.

2. A power plant according to claim 1 wherein said edge elements of said cover plates include flanges on the sides of said cover plates extending downwardly between the flanges of said channel-section members.

3. A power plant according to claim 1 wherein said channel-section members are each connected at one end only to a plate-shaped member said plate-shaped member having a hole for receiving an elongated member extending from the outer side of the combustion chamber wall for connecting said plate-shaped member to said wall.

4. A power plant as claimed in claim 3 wherein said elongated member is a rod (63).

5. A power plant as claimed in claim 3 wherein said elongated member is a tube (87).

6. A power plant according to claim 4 wherein each of said fixing members overlaps the corner of four adjacent cover plates and holds said cover plates in position, each said fixing member including a sleeve (77) slidable over said rod (63) and a locking wedge (83) passing through a slot in said sleeve (77), said rod being used to fix said sleeve and said locking wedge with respect to each other.

7. A power plant according claim 5 wherein said means for securing said fixing means includes a bolt (86), passing through said tube (87), said fixing means being connected to said bolt by a locking member on the outer side of the combustion chamber wall.

8. A power plant according to claim 7, further comprising a resilient element disposed between said locking member and the outer side of the combustion chamber wall.

* * * * *